US008019102B2

(12) United States Patent
Hatano

(10) Patent No.: US 8,019,102 B2
(45) Date of Patent: Sep. 13, 2011

(54) ACOUSTIC ADJUSTMENT DEVICE AND ACOUSTIC ADJUSTMENT METHOD

(75) Inventor: Kouji Hatano, Tokyo (JP)

(73) Assignee: Panasonic Corporation, Osaka (JP)

( * ) Notice: Subject to any disclaimer, the term of this patent is extended or adjusted under 35 U.S.C. 154(b) by 1199 days.

(21) Appl. No.: 11/576,390

(22) PCT Filed: Sep. 2, 2005

(86) PCT No.: PCT/JP2005/016126
§ 371 (c)(1),
(2), (4) Date: Mar. 30, 2007

(87) PCT Pub. No.: WO2006/038402
PCT Pub. Date: Apr. 13, 2006

(65) Prior Publication Data
US 2007/0213858 A1      Sep. 13, 2007

(30) Foreign Application Priority Data

Oct. 1, 2004  (JP) ................................. 2004-289983

(51) Int. Cl.
*H04R 5/02*  (2006.01)
(52) U.S. Cl. ..................................................... 381/310
(58) Field of Classification Search .................. 381/310, 381/309, 17, 18, 1, 119; 700/94
See application file for complete search history.

(56) References Cited

U.S. PATENT DOCUMENTS

| 6,011,851 | A | 1/2000 | Connor et al. | |
|---|---|---|---|---|
| 7,298,852 | B2 * | 11/2007 | Croft, III | 381/56 |
| 2005/0063550 | A1 * | 3/2005 | Koiwa | 381/17 |

FOREIGN PATENT DOCUMENTS

| JP | 8-23366 | A | 1/1996 |
|---|---|---|---|
| JP | 8-51699 | A | 2/1996 |
| JP | 2001-245237 | | 9/2001 |
| JP | 2003-005905 | A | 1/2003 |
| JP | 2003-100066 | | 4/2003 |
| JP | 2003-102098 | | 4/2003 |
| JP | 2003-140536 | | 5/2003 |
| JP | 2003-258988 | | 9/2003 |
| JP | 2004201195 | A * | 7/2004 |

OTHER PUBLICATIONS

European Search Report dated May 6, 2010.
Japanese Office Action dated Jan. 25, 2011.

* cited by examiner

*Primary Examiner* — Curtis Kuntz
*Assistant Examiner* — Hai Phan
(74) *Attorney, Agent, or Firm* — Pearne & Gordon LLP

(57) ABSTRACT

The present invention provides an audio control device and an audio control method capable of promptly controlling a desired sound source, by simply selecting the sound where the sound state should be adjusted among multiple sounds, without displaying the sound state of multiple sounds on a display for identifying. An audio control device according to the invention includes a cross-key manipulation detection module 1 that receives various input manipulations; a plurality of generating units 14a to 14e that generate a sound having a different sound source; and CPU 12 that controls the sound state generated by the plurality of generating units 14a to 14e, wherein the cross-key manipulation detection module 1 controls the sound state of the selected first generating unit among the plurality of generating units 14a to 14e, wherein CPU 12 generates a sound having a sound state which is controlled by the input unit in the first generating unit, generates a sound having a sound state which is different from that of the first generating unit in the other generating units.

18 Claims, 10 Drawing Sheets

FIG. 17(a)

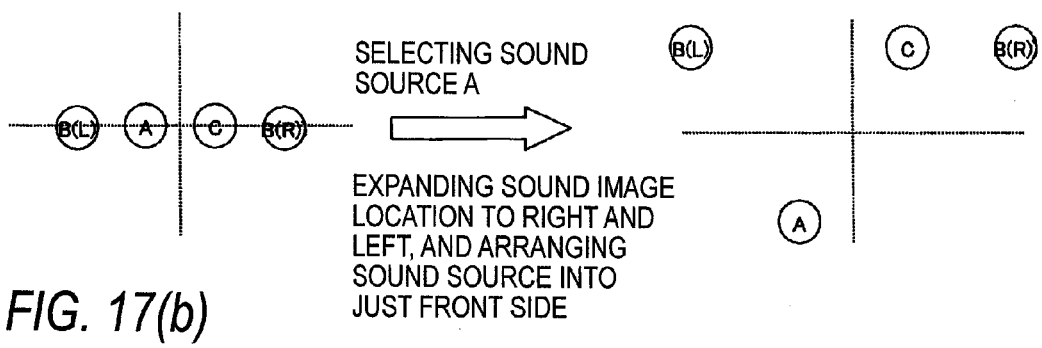

SELECTING SOUND SOURCE A

EXPANDING SOUND IMAGE LOCATION TO RIGHT AND LEFT, AND ARRANGING SOUND SOURCE INTO JUST FRONT SIDE

FIG. 17(b)

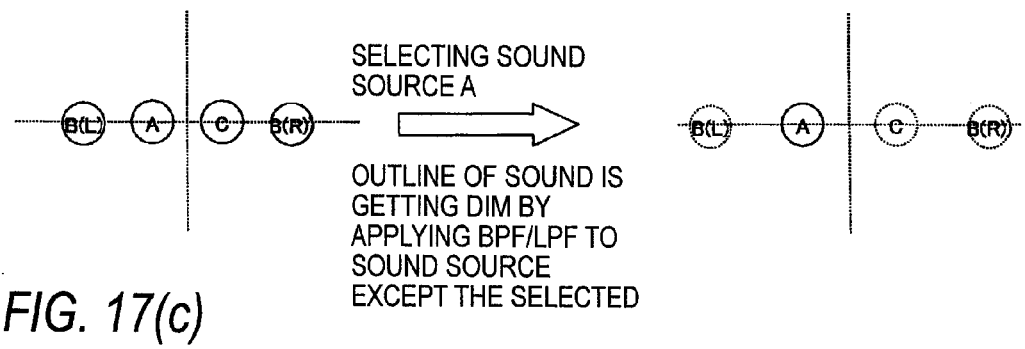

SELECTING SOUND SOURCE A

OUTLINE OF SOUND IS GETTING DIM BY APPLYING BPF/LPF TO SOUND SOURCE EXCEPT THE SELECTED

FIG. 17(c)

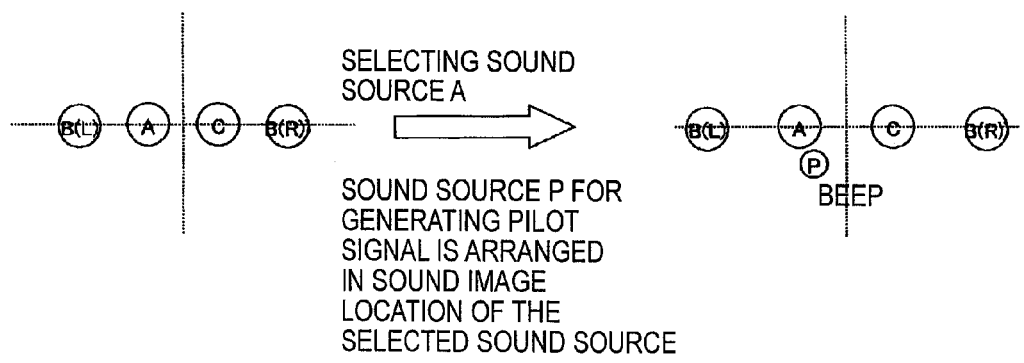

SELECTING SOUND SOURCE A

SOUND SOURCE P FOR GENERATING PILOT SIGNAL IS ARRANGED IN SOUND IMAGE LOCATION OF THE SELECTED SOUND SOURCE

ACOUSTIC ADJUSTMENT DEVICE AND ACOUSTIC ADJUSTMENT METHOD

TECHNICAL FIELD

The present invention relates to an audio control device and an audio control method, which controls the sound state of a plurality of sounds having different sound sources, such as the volume, the frequency characteristic, and the pan.

BACKGROUND ART

Various electronic equipments exist capable of outputting a plurality of sounds, for example, the ring tone of a mobile phone, the audio sound in playing audio, and the TV sound in watching TV exist. Such electronic equipment has a function that controls the volume of each of the plurality of sounds, while the user of the electronic equipment controls the volume of them, thereby the voice output environment of the user adjusted electronic equipment can be set.

As to the conventional art, a device having such audio control function, is for example, an information terminal which can control the volume balance of the audio sound in playing audio and the telephone call sound through moving a mark in a displayed volume balance bar to the right and left (for example, refer to Patent Document 1). The volume bar indicates the ratio of the volume of the audio sound and the telephone call sound. In the information terminal, since the balance of the volume can be visually identified, the volume of the audio sound and the telephone call sound can be simply controlled.

Additionally, with the controlling of the volume of the whole 5.1 channel, the volume of the center channel (the channel outputting the voice of man such as the narration or the speech), a broadcasting receiving device including a function that can extract just the sound of the center channel from the sound of the whole channel for independently controlling is suggested (for example, refer to Patent Document 2).

Patent Document 1: JP-A-2003-258988
Patent Document 2: JP-A-2001-245237

DISCLOSURE OF THE INVENTION

Problem that the Invention is to Solve

However, in the above-referenced information terminal, when multiple sounds with three or more are outputted, the correspondence should be performed by the volume balance bar. Further, in case the volume balance bar is not watched, the control of the volume balance of two can not be performed. Therefore, in case it is difficult to watch, for example, in driving a car, there is a problem in that it is not available.

Additionally, in the above referenced broadcasting receiving device, when the volume of the adjusted center channel is identified in the state that the volume of the whole channel is outputted, in case the volume of the center channel is required to be controlled again, the sound of the adjusted center channel is extracted again to adjust independently. Then, the volume of the adjusted center channel is identified in the state that the sound of the whole channel is outputted. As described, after the control of the volume of the center channel, since it is necessary that the volume control of the extracted center channel and the manipulation of the output of the sound of the whole channel are alternately repeatedly performed, it takes a time for a user. Hence, when the combination of multiple sounds that are simultaneously outputted is changed, for example, in case a ringtone is added to the multiple sounds by suddenly ringing the ringtone, there is a problem in that it is not suitable for the sudden volume control.

The invention has been designed to solve the above-mentioned problems. It is an object of the invention to provide an audio control device and an audio control method capable of easily controlling the sound state even though the sound source is three or more, since the desired sound source can be promptly controlled by simply selecting the sound where the sound state should be adjusted among multiple sounds, without displaying the sound state of multiple sounds on a display for identifying.

Means for Solving the Problem

An audio control device according to the invention includes an input unit that receives various input manipulations; a plurality of generating units that generate a sound having a different sound source; and a control unit that controls the sound state generated by the plurality of generating units, wherein the input unit selects a first generating unit among the plurality of generating units, wherein the control unit controls the other generating units to generate a sound having a sound state which is different from that of the first generating unit.

An audio control method according to the invention controls a sound state of a plurality of sounds having different sound sources, which includes a first output step of outputting the plurality of sounds; a selection step of selecting a first sound among the plurality of sounds; and a second output step of outputting a sound which is different from the first sound with a different sound state.

In the audio control device according to the invention, the input unit may select a second generating unit that is different from the first generating unit among the plurality of generating units, after selecting the first generating unit, and the control unit may control the other generating units to generate a sound having a sound state which is different from that of the second generating unit.

In the audio control method according to the invention, a second sound different from the first sound among the plurality of sounds may be selected in the selection step. A sound different from the second sound with a different sound state may be output in the second output step.

In the audio control device according to the invention, the input unit may select a third generating unit that is not selected yet among the plurality of generating units, after selecting the second generating unit, and the control unit may control the other generating units to generate a sound having a sound state which is different from that of the third generating unit.

In the audio control method according to the invention, a third sound among the plurality of sounds may not be selected yet the selection step, and a sound different from the third sound with a different sound state may be output in the second output step.

In the audio control device according to the invention, the input unit may control the sound states of the first, second, or third generating unit selected among the plurality of generating units, and the control unit may generate a sound having a sound state that is controlled by the input unit in the first, the second or the third generating unit, while the control unit controls the other generating units to generate a sound having a sound state which is different from that of the first, the second or the third generating unit.

An audio control method according to the invention includes a control step of controlling the sound state of the sound of the first, the second or the third sound that is selected in the selection step, after the output in the second output step; and a third output step of outputting the first, the second or the third sound with the controlled sound state.

According to this configuration, the invention is capable of easily controlling the sound state even though the sound source is three or more, since the desired sound source can be promptly controlled by simply selecting the sound where the sound state should be adjusted among multiple sounds, without displaying the sound state of multiple sounds on a display for identifying.

In the audio control device according to the invention, the input unit may select the generating unit which generates a sound in the nearest time point as the first generating unit, in the time point when one of the plurality of generating units is selected.

In the audio control method according to the invention, the single sound outputted last in the first step may be selected as the first sound in the selection step.

According to this configuration, the invention is capable of promptly selecting the sound that commenced rapid ringing.

In the audio control device according to the invention, the control unit may generate a sound having a sound state which is adjusted by each of the plurality of generating units in the plurality of generating units, when the input unit selects all of the plurality of generating units to finish.

In the audio control method according to the invention, the plurality of sounds with a sound state which is adjusted to each of the plurality of sounds may be output in the third selection step, when all of the plurality of sounds is selected to finish in the selection step.

According to this configuration, the invention is capable of controlling the sound state of each sound and identifying the balance of the whole sound state by one operation.

In the audio control device according to the invention, after the input unit selects the first, second, or third generating unit or after adjusting the sound state of the first, second, or third generating unit, when not receiving the input manipulation for a predetermined time, the control unit may generate a sound having a sound state which is adjusted by the plurality of generating units.

An audio control method according to the invention includes a count step of counting the elapse of time, after selecting the first, the second or the third sound in the selection step, or, after controlling the first, the second or the third sound in the control step, wherein the third output step outputs the plurality of sounds with a sound state which is adjusted to each of the plurality of sounds, in case of counting after the elapse of a predetermined time in the count step.

According to this configuration, the invention is capable of manipulating the whole sound state automatically, after selecting one sound, thereby, the convenience of a user can be enhanced.

In the audio control device according to the invention, the control unit may generate a sound having a sound image location which is different from that of the first, second, and third generating unit in the other generating units.

In the audio control method according to the invention, a sound different from the first, second, and third sounds in the other sound image location may be output in the second output step.

According to this configuration, the invention is capable of simply selecting the sound where the sound state should be controlled, since the sound image location of the sound where the sound state should be controlled is differently positioned from the sound image location of the other sound such that it can be easily identified with hearing.

In the audio control device according to the invention, the control unit may generate a sound having a sound tone different from that of the first, second, and third generating unit in the other generating units.

In the audio control method according to the invention, a sound different from the first, second, and third sounds with a different sound tone may be output in the second output step.

According to this configuration, the invention is capable of simply selecting the sound where the sound state should be controlled, since the sound tone of the sound where the sound state should be controlled is different from the sound tone of the other sound such that it can be easily identified with hearing.

In the audio control device according to the invention, the control unit may generate a sound in a sound image location opposed to the first, second, or third generating unit in the other generating units.

In the audio control method according to the invention, another sound in a sound image location opposed to the first, second, or third sound may be output in the second output step.

According to this configuration, the invention is capable of exactly selecting the sound where the sound state should be controlled, since the sound image location of the sound where the sound state should be controlled is differently positioned from the sound image location of the other sound such that it can be easily identified with hearing.

Advantage of the Invention

According to the audio control device and method of the invention, the audio control device according to the invention has an advantage that a desired sound source can be promptly controlled, by simply selecting the sound where the sound state should be adjusted among multiple sounds, without displaying the sound state of multiple sounds on a display for identifying.

BRIEF DESCRIPTION OF THE DRAWINGS

FIG. 17 is a drawing illustrating an example of a change of the selection state according to an embodiment of the invention.

DESCRIPTION OF REFERENCE NUMERALS AND SIGNS

Figure 1:
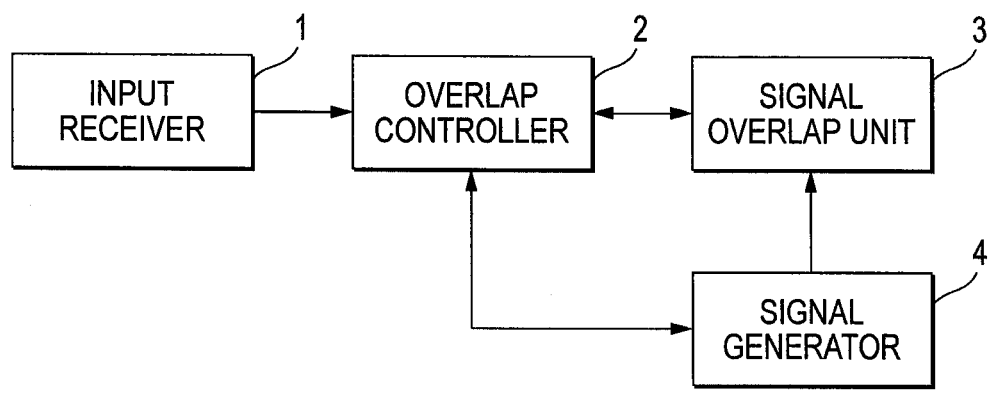
FIG. 1 is a block diagram illustrating a basic configuration of an audio control device according to an embodiment of the invention.

1: input receiver
2: overlap controller
8: signal overlap unit
4: signal generator
11: cross key manipulation detection module
12: CPU
13: audio mixer
14a: audio player
14b: alarm notification unit
14c: receiving notification unit
14d: decoder
14e: encoder
19: communication controller
20: wireless controller
21: headphone
22: speaker
23: microphone

BEST MODE FOR CARRYING OUT THE INVENTION

Hereinafter, exemplary embodiments of audio controller according to the invention will be described with reference to the accompanying drawings.

The basic configuration of an audio control device according to an embodiment of the invention is shown in FIG. 1. The audio control device includes an input receiver 1 that receives various input manipulations from a user, an overlap controller 2 that controls input-output signals of each unit, signal overlap unit 3 that overlaps the sound from a plurality of sound sources, and a signal generator 4 having three or more sound sources.

The input receiver 1 receives the manipulation of a user or the control signal (such as remote controller output, manipulation command), and outputs manipulation information based on such information. The overlap controller 2 calculates the parameters (sound image location, sound tone) of sound signal, based on the manipulation information from the input receiver 1 and the signal generation information (information on the channel of the signal overlap unit 3 to which the sound signal is inputted) from the signal overlap unit 3 or, to output to the signal overlap unit 3, the signal generator 4. The signal overlap unit 3 overlaps the sound signal inputted from the signal generator 4 according to the output of the overlap controller 2. The signal generator 4 outputs the sound signal from the plurality of sound sources to the overlap controller 2 and the signal overlap unit 3.

Figure 2:
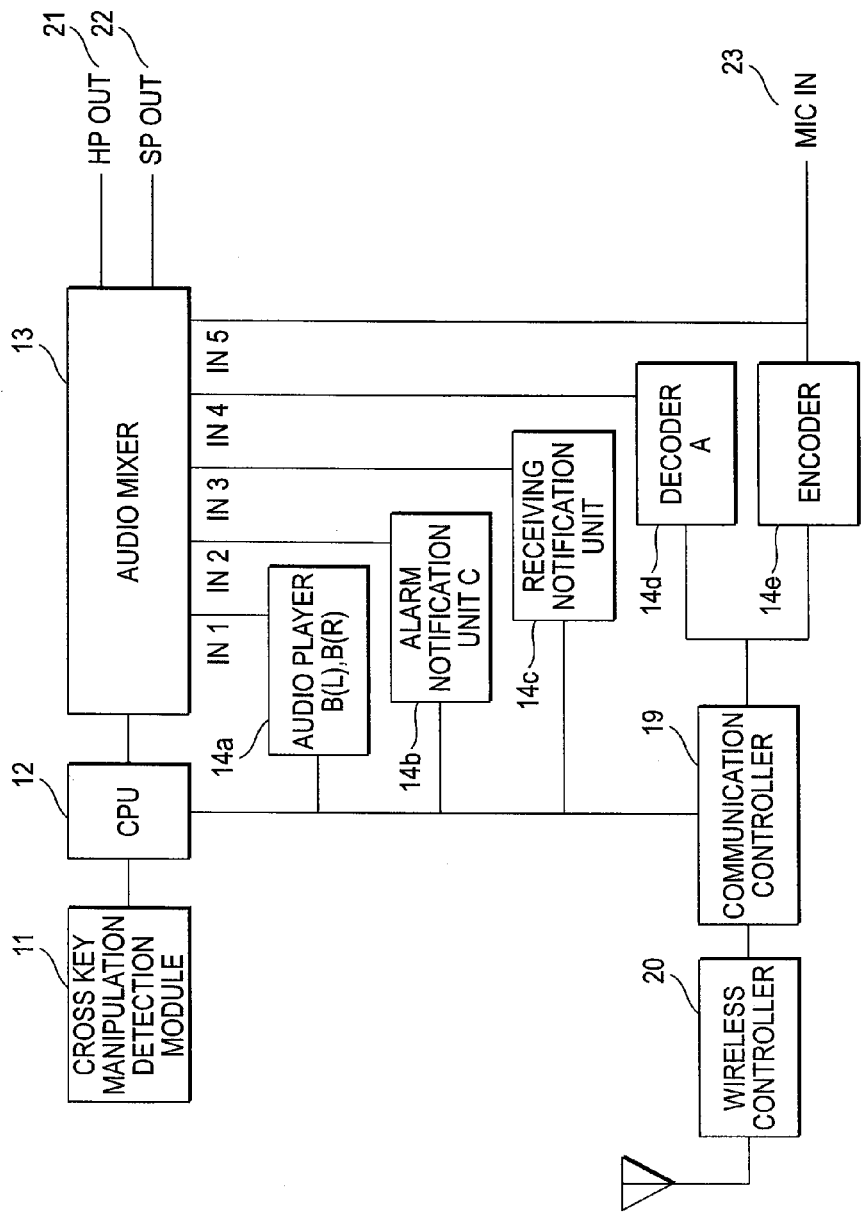
FIG. 2 is a block diagram illustrating a detailed configuration of an audio control device according to an embodiment of the invention.

FIG. 2 is a block diagram illustrating a detailed configuration of an audio control device according to an embodiment of the invention. In the same drawing, 12 represents CPU that controls the whole, while a cross-key manipulation detection module 11 and an audio mixer 13 are coupled to it. Here, an audio player 14a, an alarm notification unit 14b, and a receiving notification unit 14c are provided as a multiple sound source. Additionally, a decoder 14d and an encoder 14e are provided. They perform the decoding, and encoding of the signal for a communication controller 19 that controls a wireless controller 20, to output the sound of the counterpart of telephone call through a headphone 21 (HP OUT) and a speaker 22 (SP OUT), and input the sound of the apparatus user through a microphone 23 (MIC IN) to be able to perform a sound communication.

The cross-key manipulation detection module 11 corresponds to the input unit (input receiver 1 of FIG. 1) of claims, and selects any sound among sounds outputted from the audio player 14a that outputs sound signals having different sound sources, the alarm notification unit 14b, the receiving notification unit 14c, the decoder 14d, and the encoder 14e (a plurality of generating units of claims, corresponding to signal generator 4 of FIG. 1). Additionally, CPU 12 corresponds to a first function (overlap controller 2 of FIG. 1) of the control unit of the claims, configured to control the sound state (such as sound image location, sound tone, volume) of sound inputted from the audio player 14a, the alarm notification unit 14b, and the receiving notification unit 14c. Additionally, the audio mixer 13 corresponds to a first function (signal overlap unit 3 of FIG. 1) of the control unit of the claims, and overlaps the sound inputted from the audio player 14a, the alarm notification unit 14b, and the receiving notification unit 14c. Additionally, the audio mixer 13 outputs the overlapped sound signal to the headphone 21 (HP OUT) or the speaker 22 (SP OUT). CPU 12 and the audio mixer 13 are described with a different configuration, but CPU 12 may simultaneously perform the function of the audio mixer. Further, the audio mixer 13 is described to input the sound from the audio player 14a, the alarm notification unit 14b, and the receiving notification unit 14c, however, various sound sources such as audio player 14a, alarm notification unit 14b, receiving notification unit 14c can be built in to the audio mixer 13 itself.

Figure 3:
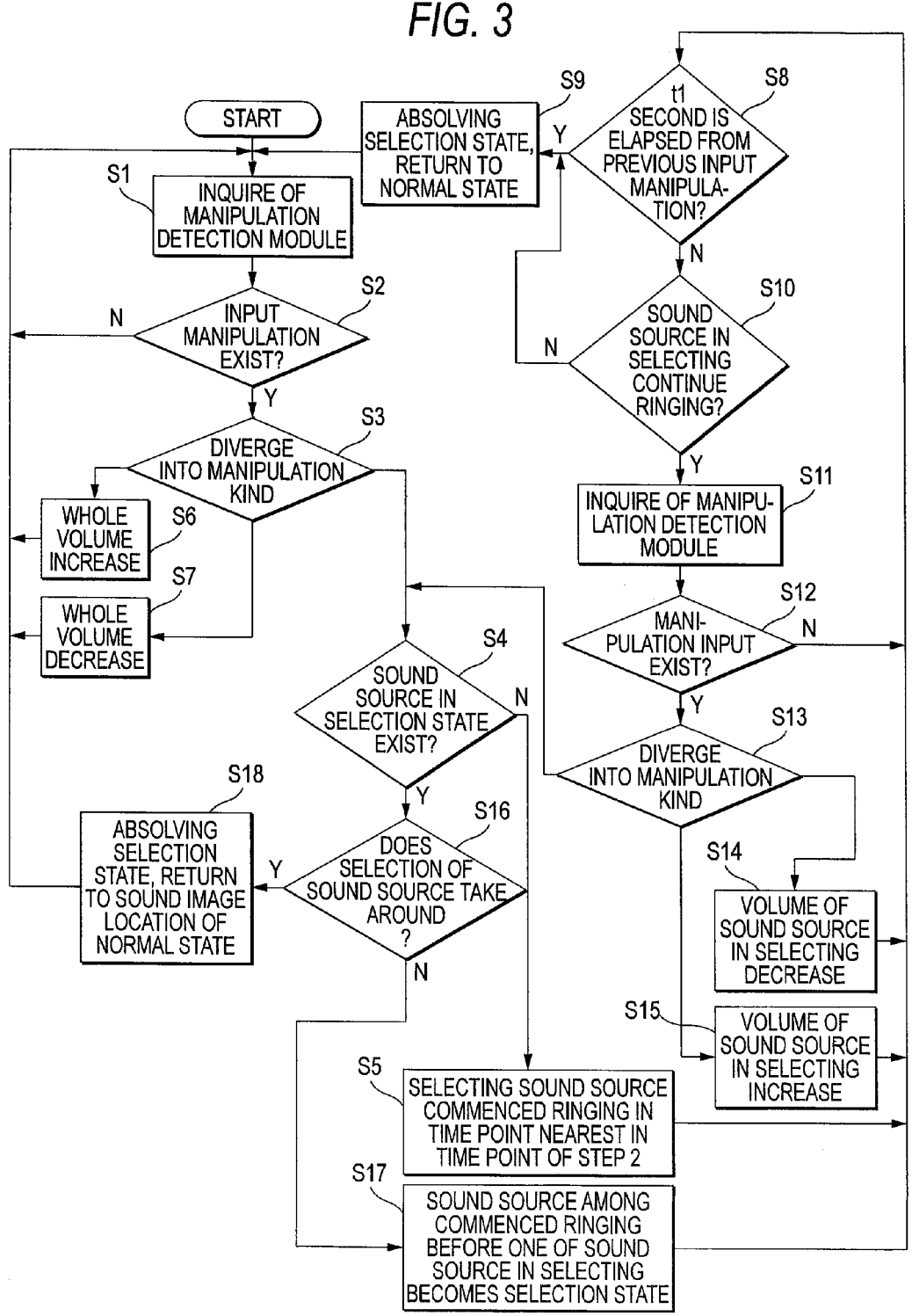
FIG. 3 is a flowchart illustrating a manipulation of an audio control device according to an embodiment of the invention.

Next, the manipulation example of the sound control apparatus of an embodiment will be described with reference to the drawings. The flowchart illustrating the manipulation of an audio control device in the embodiment of the invention is shown in FIG. 3. In FIG. 4 to FIG. 15, the relation of the manipulation (center of drawing) of the cross-key, the sound image location B(L) and B(R) of audio sound outputted from the audio player 14a, the sound image location C of the alarm sound outputted from the alarm notification unit 14b, and the sound image location (right of drawing) of the communication sound (A) outputted from the decoder 14d is shown. Hereinafter, the manipulation sequence will be described according to the flow chart illustrating the manipulation of the audio control device in the embodiment of the invention shown in FIG. 3.

Figure 4:
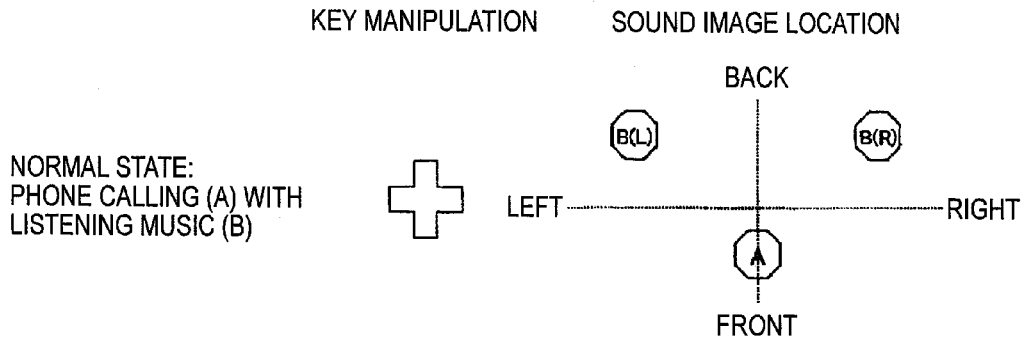
FIG. 4 is a drawing illustrating a first manipulation example of an audio control device according to an embodiment of the invention.
Figure 5:
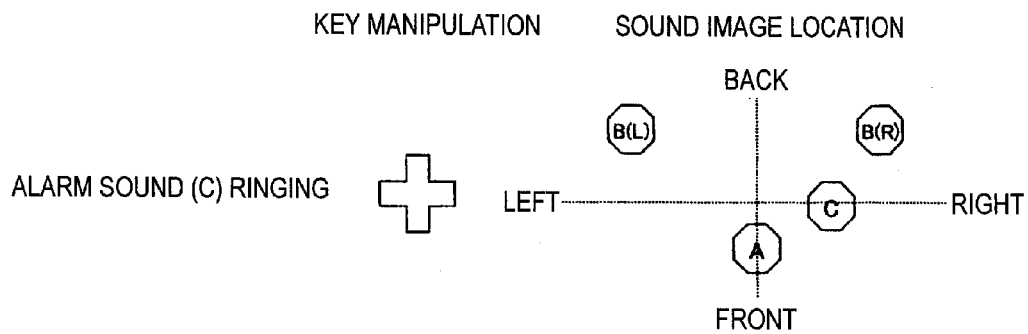
FIG. 5 is a drawing illustrating a second manipulation example of an audio control device according to an embodiment of the invention.
Figure 6:
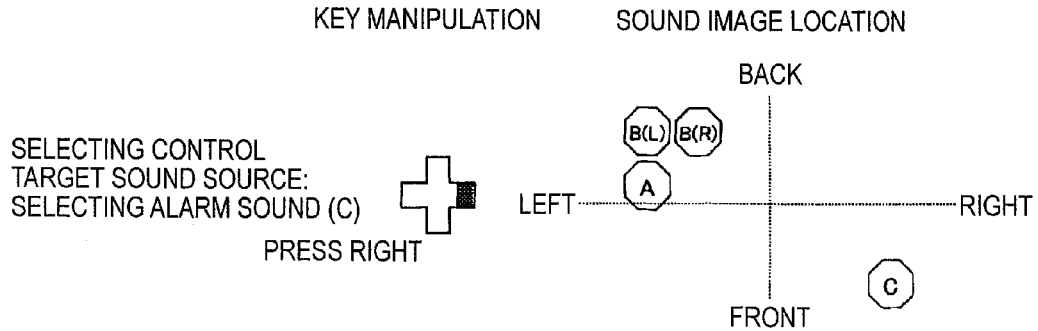
FIG. 6 is a drawing illustrating a third manipulation example of an audio control device according to an embodiment of the invention.

In case the audio sound from the audio player 14a and the communication sound from the decoder 14d are outputted from the sound image location shown in FIG. 4, CPU12 inquires of the cross-key manipulation detection module 11, and identifies whether the input manipulation from the user is performed or not (S1). At this time, the alarm notification unit 14b renewedly commences the ringing of the alarm sound in the sound image location shown in FIG. 5. As shown in FIG. 6, in case the user presses the right of the cross-key, CPU12 detects the input manipulation of the cross-key (S2, YES), and identifies the pressing of the right of the cross-key (S3, right). CPU12, in case one of the plurality of sound sources is not selected (S4, NO), by pressing the right of the cross-key, selects the alarm sound that begins a ringing in the time point which is most close to the time point when the input manipulation of the cross-key in the step 2 is detected as a sound source of control target. As shown in FIG. 6, CPU12 commands the audio mixer 13 to change the sound image location of the audio sound and communication sound to the location far from the sound image location of the alarm of the sound source of control target. After that, the state that one of the plurality of sound sources is selected is defined as a selection state, while, on the contrary, the state that it is not selected is defined as a normal state.

As shown in FIG. 6, the sound image location of the alarm that is the sound source of control target is far from the sound image location of the sound from the other sound sources to be outputted, thereby, the user can easily select the sound to be selected among the plurality of sound sources by hearing. Additionally, the alarm sound that begins a ringing in the time point which is most close to the time point when the input manipulation of the cross-key in the step 2 is detected is set as the first sound source to be selected, thereby, a prompt response can be performed for the sound that commenced a rapid ringing.

Figure 7:
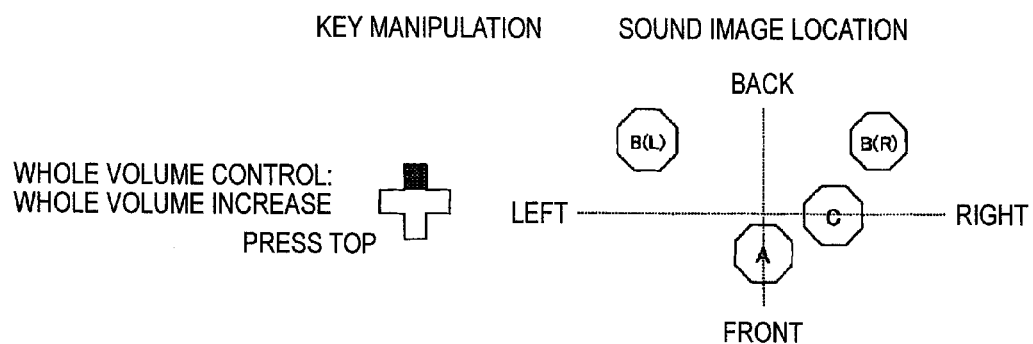
FIG. 7 is a drawing illustrating a fourth manipulation example of an audio control device according to an embodiment of the invention.
Figure 8:
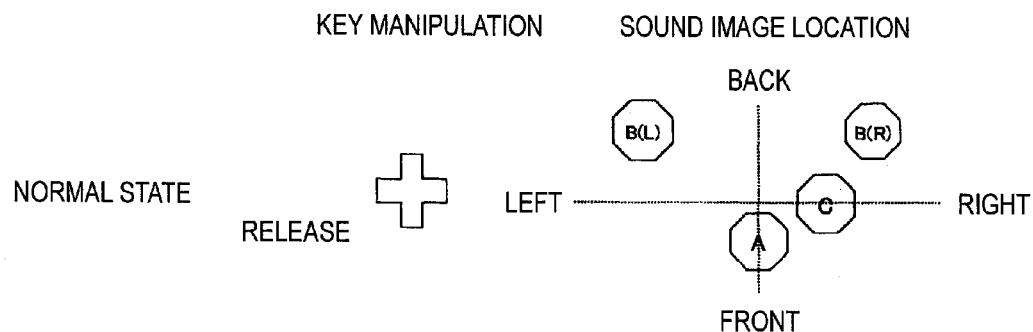
FIG. 8 is a drawing illustrating a fifth manipulation example of an audio control device according to an embodiment of the invention.

Further, in case CPU12 determines that the top and the bottom of the cross-key are pressed in step 3 (S3, top or bottom), CPU12 commands the audio mixer 13 so as to increase or decrease the whole volume of the plurality of the sound sources to output (S6, S7) as shown in FIG. 7, and goes back to the step 1, thereby, it becomes the normal state shown in FIG. 8 where the whole volume of the plurality of the sound sources is controlled.

Figure 9:
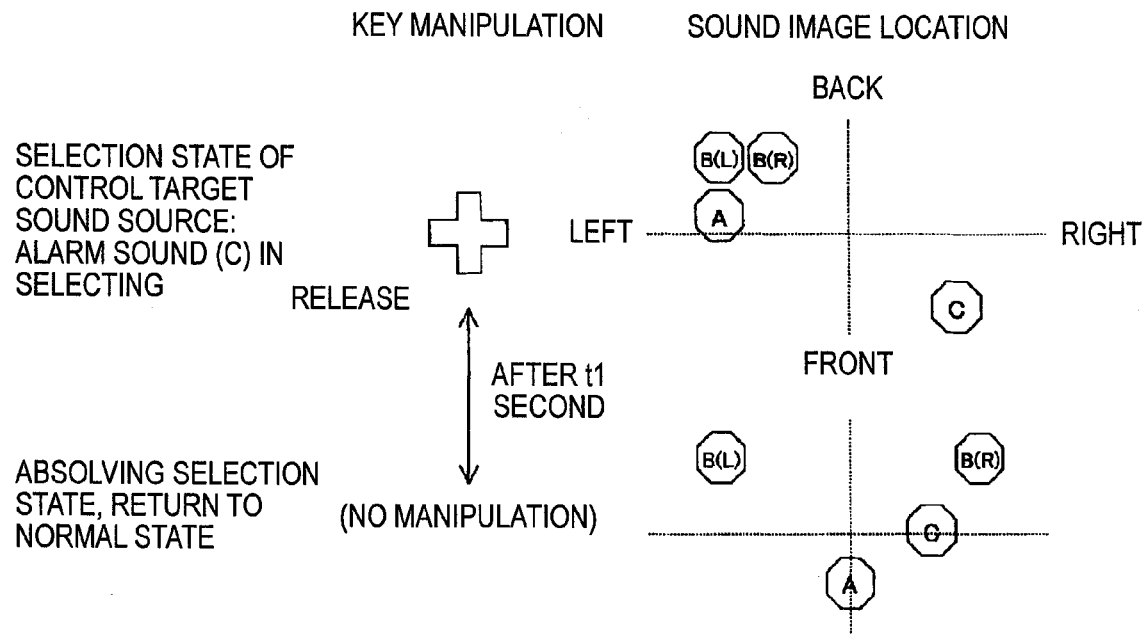
FIG. 9 is a drawing illustrating a sixth manipulation example of an audio control device according to an embodiment of the invention.
Figure 10:
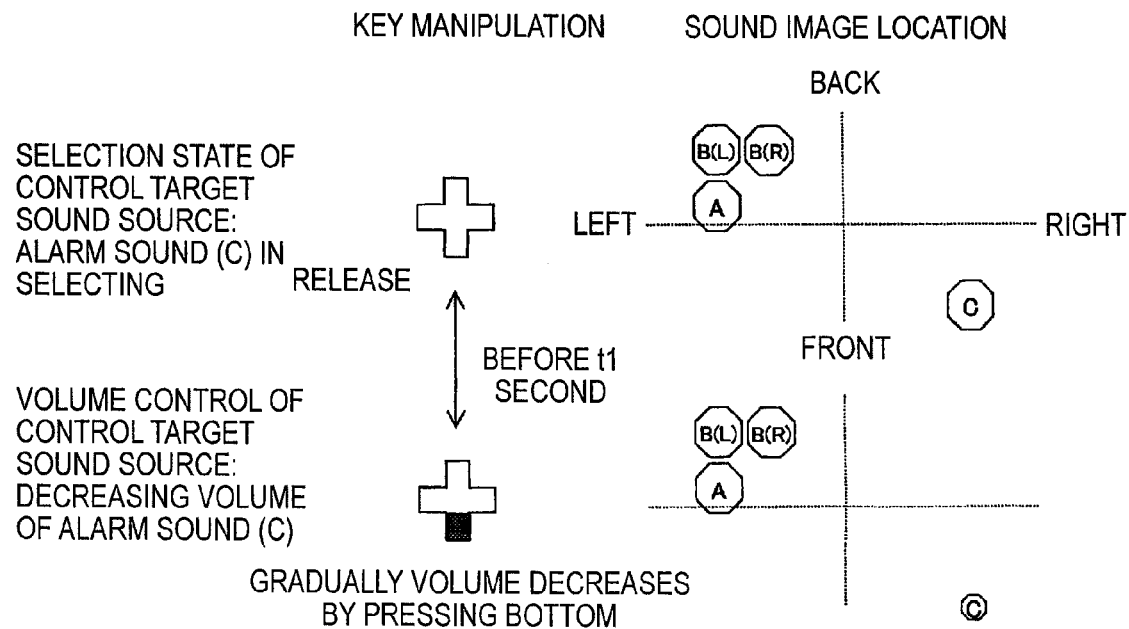
FIG. 10 is a drawing illustrating a seventh manipulation example of an audio control device according to an embodiment of the invention.
Figure 11:
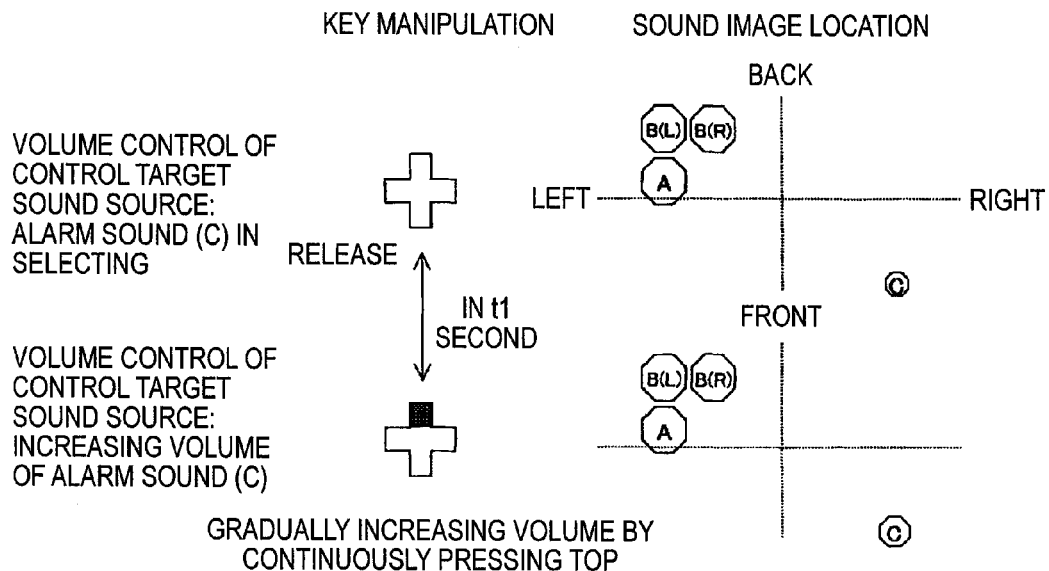
FIG. 11 is a drawing illustrating an eighth manipulation example of an audio control device according to an embodiment of the invention.

After the alarm sound is selected as a sound source of control target in the step 5, in case t1 second is elapsed after the right of the cross-key (pressed in the step 3) is released (S8, YES), as shown in FIG. 9, CPU12 absolves the alarm sound selected as a sound source of control target from the selection state, and it goes back to the normal state where the sound source of control target is not selected in FIG. 1 (S9). In case the alarm sound of the sound source of control target continues ringing (S10, YES) within t1 second after the right of the cross-key pressed in the step 3 is released (S8, NO), CPU12 inquires of the cross-key manipulation detection module 11 (S11), determines whether the input manipulation by the user is performed or not (S12). At this time, in case the user press the bottom of the cross-key as shown in FIG. 10, CPU12 detects the input manipulation of the cross-key (S12, YES), and determines that the bottom of the cross-key is pressed (S13, bottom), and commands the audio mixer 13 so as to decrease the volume of the alarm sound of the sound source of control target to output (S14). Additionally, as shown in FIG. 11, in case the user presses the top of the cross-key within t1 second after the release of the bottom of the cross-key pressed in the step 13, after the processing 12 in the step 8, the press of the top of the cross-key is determined (S13, top), then, the audio mixer 13 is commanded to increase the volume of the alarm sound of the sound source of control target (S15). Further, in the step 10, in case the alarm sound of the sound source of control target does not continue ringing (S10, NO), the step 9 proceeds to absolve the alarm sound from the sound source of control target. Additionally, in the step 12, in case the input manipulation of the cross-key is not detected (S12, NO), it goes back to the step 8, the processing of the step 8 to the step 12 is repeatedly performed.

In the step 8, by setting the time from the previous input manipulation to the next input manipulation as a criterion, the selection state and the normal state are changed, thereby, the user can identify the sound outputted from the plurality of sound sources, by simply changing into the normal state, without performing the input manipulation, when the sound outputted from all the plurality of sound sources is identified after the control of any sound source.

Figure 12:
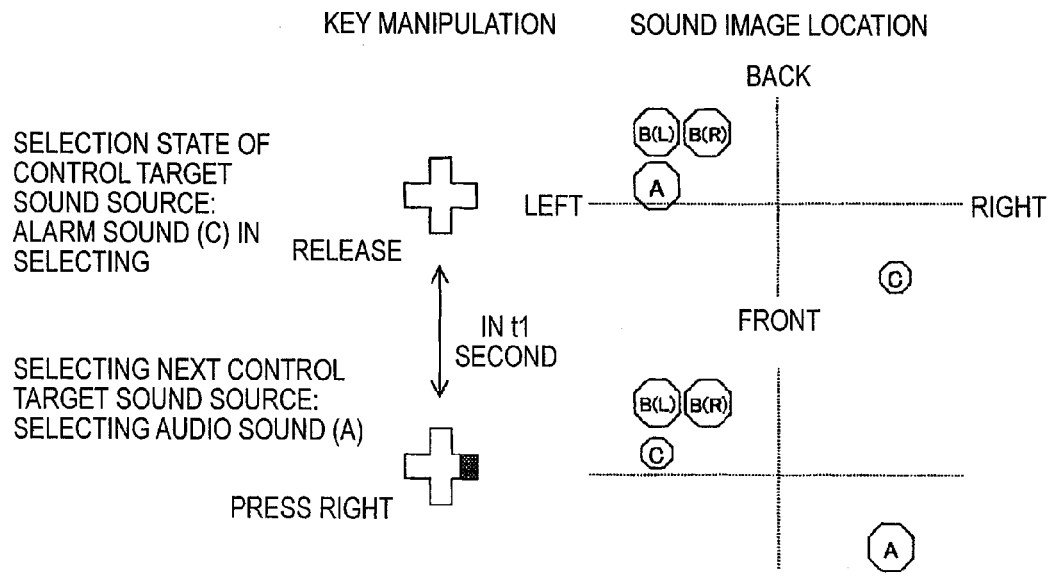
FIG. 12 is a drawing illustrating a ninth manipulation example of an audio control device according to an embodiment of the invention.
Figure 13:
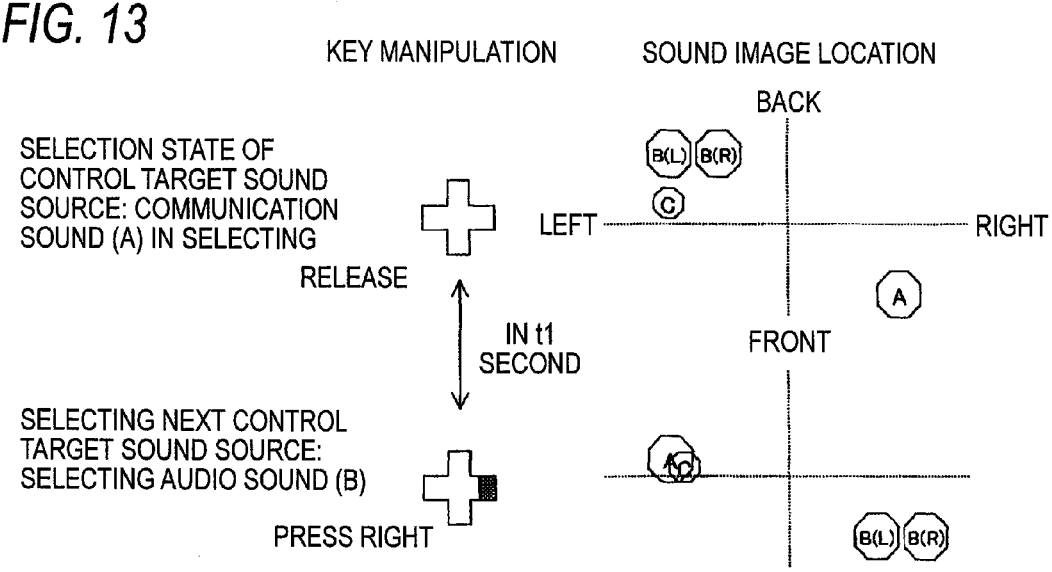
FIG. 13 is a drawing illustrating a tenth manipulation example of an audio control device according to an embodiment of the invention.

Additionally, as shown in FIG. 12, in case CPU12 determines that the user pressed the right of the cross-key within t1 second after the release of the cross-key pressed in the step 13 (S13, right), it goes back to the step 4. At this time, since one of the plurality of sound sources is already selected (S4, YES), CPU12 determines that the whole of the plurality of sound sources are selected by taking a round. In case it is determined that not all the plurality of sound sources are selected (S16, NO), the sound source that commenced ringing in the time point which is most close to the time point of the step 2, among the plurality of sound sources excepting the sound source of control target which is selected in that time point, the communication sound is selected as a next sound source of control target in FIG. 12 (S17), the processing of the step 8 to the step 15 is performed.

Figure 14:
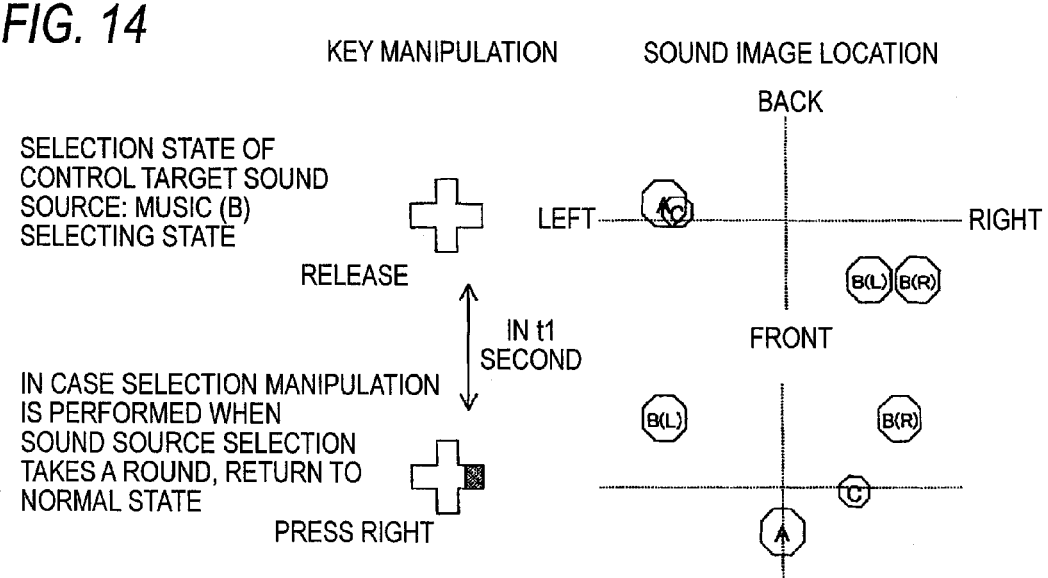
FIG. 14 is a drawing illustrating an eleventh manipulation example of an audio control device according to an embodiment of the invention.
Figure 15:
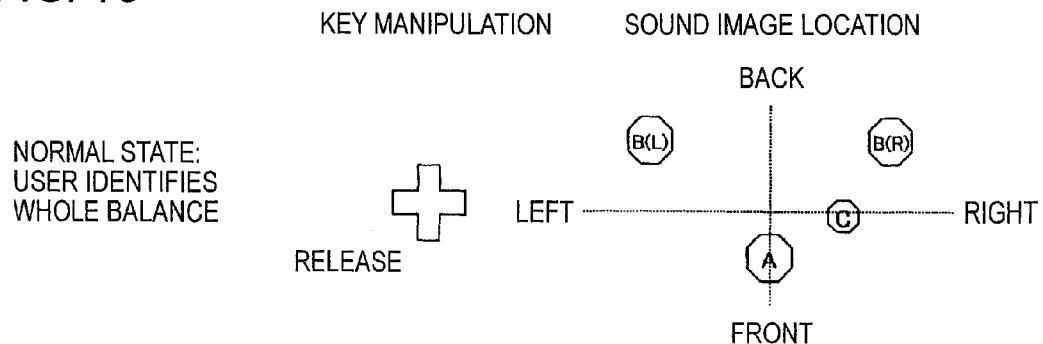
FIG. 15 is a drawing illustrating a twelfth manipulation example of an audio control device according to an embodiment of the invention.

In the step 13, as shown in FIG. 14, CPU12 determines that the user pressed again the right of the cross-key within t1 second after the release of the cross-key pressed in the step 13 (S13, right). After the processing of the step 4, in the step 16, in case it is determined that all the plurality of sound sources are selected by taking a round (S16, YES), the audio sound selected as a sound source of control target is absolved from the selection state, and it goes back to the normal state where the sound source of control target of the step 1 is not selected (S18), then, the user identifies the balance of the whole of the plurality of sound sources.

As shown in FIG. 14, in case it is determined that all the plurality of sound sources are selected by taking a round, the sound source selected as a sound source of control target is absolved from the selection state to automatically go back to the normal state, thereby, the user can identify the balance of the whole of the plurality of sound sources without the effort for the manipulation.

As described above, according to the audio control device of the embodiment, without identifying by indicating the sound state of the plurality of sounds on a display, the sound which should be adjusted in the sound state is simply selected among the plurality of sounds, thereby, the desired sound state can be promptly controlled. Further, without increasing the number of the component for controlling, it can be easily controlled though the sound source is three or more.

Further, as to the audio control device of the embodiment described above, the input unit and the control unit of the claims can be configured with a separate case. For example, the manipulation input (input receiver) corresponding to the input unit of claims can be configured as a controller of embedded head set, while the sound selection, the sound state control (overlap controller) and the mixing (signal overlap unit) corresponding to the control unit of claims can be configured in the main body of a mobile phone.

Further, the control unit and the generating units of the claims can be configured with a separate case. For example, the manipulation input (input receiver), the sound image location and the calculation of volume control (overlap controller) are performed with a remote controller. The calculation result of what sound source should be positioned in what point of sound image location with what volume can be sent to the mixer (signal overlap unit) built in to a digital broadcasting receiver or an internet TV, while the mixer performs mixing the sound from the sound source (signal generator) according to the calculation result to output.

Further, the overlap controller directly controls the plurality of sound sources (signal generator), and inputs the sound having adjusted sound state into the mixer (signal overlap unit), thereby, the mixer can perform overlapping. Otherwise, after the sound from plurality of sound sources is inputted into the mixer, the sound state can be controlled by the mixer to perform overlapping again.

Further, the sound source (signal generator) can be configured with a built-in mixer (signal overlap unit).

Figure 16A:
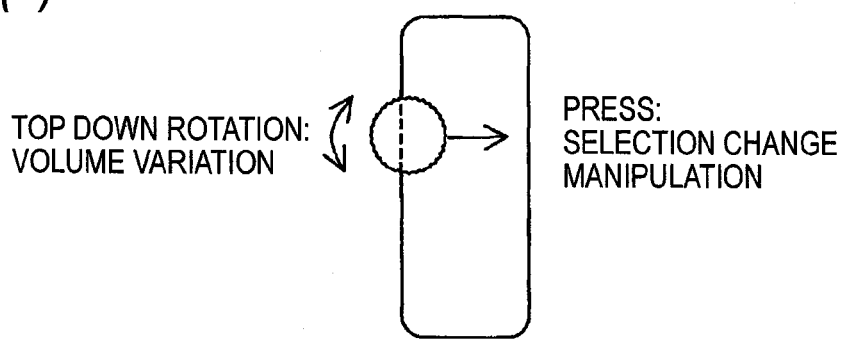
FIG. 16 is a drawing illustrating another manipulation example of an audio control device according to an embodiment of the invention.
Figure 16B:
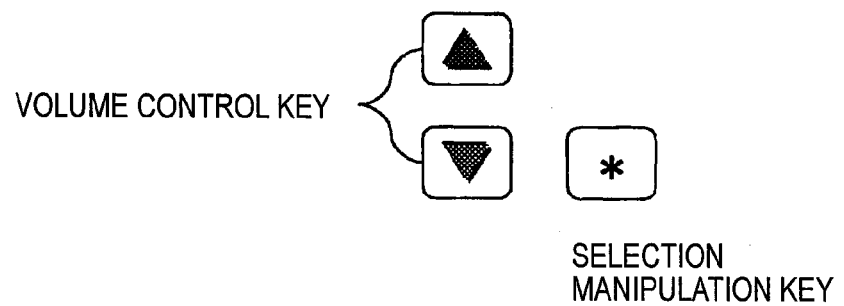

FIG. 16 is a drawing illustrating an example of another manipulation input. In FIG. 16a, the variation of the sound volume are adjusted by the up and down rotation of a rotation body, and a selection change manipulation can be executed by pressing the rotation body. In FIG. 16b, a control key of volume and a selection manipulation key are arranged separately. Besides, an operation to swing a terminal is detected by using an acceleration velocity sensor, and thus a selection change can be performed. Further, the selection manipulation and the manipulation for the variation of volume may be executed by voice recognition.

FIG. 17 is a drawing of an example illustrating change of a sound state of a sound source, and in particular, shows the case that a sound source of communication sound (A) is selected. FIG. 17a shows an example in which a sound source of control target selected by expanding the sound image location in the left and the right direction is arranged at a just front side, FIG. 17b shows an example in which outline of a sound is getting dim by applying BPF/LPF to the sound source except the selected sound source. FIG. 17c shows an example in which a sound source P for generating a pilot signal is arranged in the sound image location of the selected sound source. In this case, in response to adjustment of volume, the volume of the pilot sound source is increased. Although it has been described in an embodiment of the invention that the sound image location is changed into two-dimension, the change into one-dimension or three-dimension may be available.

Further, in connection with the configuration of an external output unit connected to an audio control device, it is possible to change the sound image location. For example, the sound image location can be expanded more extensively in case of output of a speaker as compared with output of a headphone. It is possible to excellently identify the sounds outputted from the plurality of sound sources by changing the sound image location or a sound tone of the output unit such as a headphone, or a speaker.

Further, in an example in which a sound source is changed when selecting a sound source of control target, a suitable setting can be established for switching as follows.

The plurality of the sound sources are selected according to a descending/ascending order of sound volume. In this case, a sound source which is a complicated • unpleasant sound source/easily eliminated sound source can be initially adjusted.

Among the plurality of sound sources, above all, a sound source where audibly unmasking/masking is performed is selected sequentially. In this case, a sound source which is a complicated • unpleasant sound source/easily eliminated sound source can be initially adjusted. Further, a predetermined bandwidth can be selected according to a descending order of power level. In this case, if the sound bandwidth of 1 kHz to 4 kHz is set as a predetermined bandwidth, the sound sources including human voices can be initially adjusted, thereby, it is possible to listen to conversation or speech without omitting them.

Whenever the right key of the cross-key is pressed, it is set as a ⌈rotary method⌋ in which selection is changed with the type of A-B-C-A-B-C- . . . , or a ⌈return method⌋ in which selection is changed with the type of A-B-C by pressing the right key, and with the type of C-B-A by pressing the left key.

Since the sound source can be selected sequentially by pressing the right key, the selection is absolved after a predetermined time is elapsed, however, the selection can be absolved immediately by pressing the left key. In this case, the selection can be absolved even though a predetermined time is not elapsed, thereby, it is possible to complete the adjustment of the sound state rapidly.

In case of one sound source, the sound state of the sound source can be controlled by just only the press of an up and down key. That is because people sometimes may be surprised due to an alarm ringing when carelessly the entire sound volume is increased in increasing the sound volume.

Further, the condition where a plurality of sound sources becomes the selection state is set in advance, thereby, even if the input manipulation for selecting one of the plurality of sound sources is not executed, it may be possible to automatically select a sound source satisfying the condition as a sound source of control target. Hereinafter, examples of the condition will be illustrated.

The sound source that commenced an alarm ringing is configured such that it can be automatically in a selection state immediately after the ringing or after a predetermined time. In this case, the sound state can be controlled just only by manipulating a cross key into up and down. Therefore, as illustrated above, when a ringtone begins to ring suddenly with a high volume, it is very effective for an instant volume control.

If an alarm begins to ring, it is automatically set as a sound source of control target, thereby, it is possible to promptly control the sound source having a high possibility of an unexpected alarm ringing.

Further, it is set for the plurality of sound sources whether the selection state can be made or not, thus, by limiting the sound source where the selection state can be made, an useless sound source can not be selected.

Further, the user sets the priority for the plurality of sound sources, then, selects the sound source of control target in the sequence of the priority, thereby, the sound source that becomes the sound source of control target is adjusted to the using type of the user. The priority can be automatically controlled by learning the input manipulation of the user.

Further, in the embodiments of the invention, the example of the input manipulation with the cross-key is described as an input manipulation which is performed when the sound source of control target is selected, and, when the whole of the plurality of sound sources is selected by absolving the selection state of the sound source of control target, however, it is not limited to this. That is, through performing the selecting with a long pressing or a double click, the input manipulation by the operator excepting the cross key, such as a numeric keypad or a mouse can be used.

Further, as to the volume control, it will be set as follows.

In case the volume of the selected sound source is increased, the volume of the other sound source is configured to be decreased, on the contrary, in case the volume of the selected sound source is decreased, the volume of the other sound source is configured to be increased. Otherwise, the balance of the whole volume is configured to be constant. In this case, it is effective when one wants to change only the balance promptly without changing the whole volume.

In case the sound source is in the selection state, the sound source can be mute by the press of the key of other key including a long press of the key or a double click. In this case, it is effective for a prompt volume control when the ringtone begins to ring with a high volume.

Further, in the embodiments of the invention, it is described that the volume of the plurality of sound sources is controlled, however, the sound signal such as frequency characteristic, pan, effect (reverb, echo, flanger, compressor, limiter, etc) can be controlled like the volume. Thereby, as to the output of MIDI sound source, the value such as program number (sound color), control change (transpose, expression, volume, pan, pitch bend) also can be controlled.

The present invention is described in detail with reference to a specified embodiment, It will be apparent to those skilled in the art that various modifications and variation can be made in the invention without departing from the spirit or scope of the invention.

The present invention is based on Japanese Patent Application No. 2004-289983) filed on Oct. 1, 2004, which is hereby incorporated by reference.

INDUSTRIAL APPLICABILITY

The audio control device of the invention has the effect that a desired sound source can be promptly controlled, by simply selecting the sound where the sound state should be adjusted among multiple sounds, without displaying the sound state of multiple sounds on a display for identifying. Additionally, it is available for the audio control device and the audio control method that controls the sound state such as the volume of the plurality of sounds having different sound sources, frequency characteristic, and pan.

The invention claimed is:

1. An audio control device comprising;
an input unit that receives various input manipulations;
a plurality of generating units that each generate a respective sound having a different sound source, and
a control unit that controls respective sound states generated by the plurality of generating units,
wherein the input unit selects a first generating unit among the plurality of generating units, and
wherein the control unit controls the other generating units such that each of the other generating units generates a respective sound having a sound state which is a sound image location which is different from that of the first generating unit and to which it is automatically moved by the control unit based on the input unit selecting the first generating unit.

2. The audio control device according to claim 1, wherein the input unit selects, as the first generating unit, a generating unit that most recently generated a sound.

3. The audio control device according to claim 1, wherein the input unit selects a second generating unit that is different from the first generating unit among the plurality of generating units, after selecting the first generating unit, wherein the control unit controls the first generating unit to generate a sound having a sound state which is different from that of the second generating unit.

4. The audio control device according to claim 3, wherein the input unit selects a third generating unit that is not selected yet among the plurality of generating units, after selecting the second generating unit, wherein the control unit controls the second generating unit to generate a sound having a sound state which is different from that of the third generating unit.

5. The audio control device according to claim 1, wherein the plurality of generating units includes a second generating unit and a third generating unit, wherein the input unit controls the sound state of the first, the second or the third generating unit that are selected among the plurality of generating units, wherein the control unit controls the first, the second or the third generating unit to generate a sound having a sound state that is controlled by the input unit, while the control unit controls the other generating units to generate a sound having a sound state which is different from that of the first, the second or the third generating unit.

6. The audio control device according to claim 5, wherein, after each of the plurality of generating units has been selected by the input unit, the control unit controls the plurality of generating units such that their respective sound states are returned to normal states.

7. The audio control device according to claim 1, wherein the plurality of generating units includes a second generating unit and a third generating unit, wherein the control unit, after the input unit selects the first, the second or the third generating unit, or, after adjusting the sound state of the first, the second or the third generating unit by the input unit, in case of not receiving any input manipulation for a predetermined time, controls the plurality of generating units such that their respective sound states are returned to normal states.

8. The audio control device according to claim 1, wherein a first generating unit sound image location is positioned in an opposite side with respect to each sound image location that is automatically moved by the control unit.

9. The audio control device according to claim 1, wherein the control unit controls the other generating units such that each generates a respective sound tone which is different from that of the first generating unit.

10. An audio control method which controls respective sound states of a plurality of sounds having different sound sources, the method comprising:
a first output step of outputting the plurality of sounds;
a selection step of selecting a first sound among the plurality of sounds; and
a second output step of outputting the first sound, and outputting the other sounds of the plurality of sounds such that each of the other sounds has a respective sound state which is a sound image location which is different from that of the first sound, wherein outputting the other sounds includes automatically moving the sound image location of each of the other sounds so as to be different from that of the first sound, based on the first sound being selected in the selection step.

11. The audio control method according to claim 10, wherein the selection step includes selecting a single sound that is outputted last in the first step as the first sound.

12. The audio control method according to claim 10, wherein the selection step includes selecting a second sound different from the first sound among the plurality of sounds, and the second output step includes outputting the second sound with a different sound state from that of the first sound.

13. The audio control method according to claim 12, wherein the selection step includes selecting a third sound not selected yet among the plurality of sounds, and the second output step includes outputting the third sound with a different sound state from that of the second sound.

14. The audio control method according to claim 10, wherein the plurality of sounds includes a second sound and a third sound, the method further comprising:
 a control step of controlling the sound state of the first, second, or third sound, after the output in the second output step; and
 a third output step of outputting the first, second, or third sound with the controlled sound state.

15. The audio control method according to claim 14, further comprising the step of returning the respective sound states of the plurality of sounds to normal after each of the plurality of sounds has been selected.

16. The audio control method according to claim 10, wherein the plurality of sounds includes a second sound and a third sound, the method further comprising:
 a count step of counting the elapse of time, after selecting the first, second, or third sound or after controlling the first, second, or third sound and then returning the respective sound states of the plurality of sounds to normal after the elapse of a predetermined time in the count step.

17. The audio control method according to claim 10, wherein the sound image location of each of the other sounds is opposite to a sound image location of the first sound.

18. The audio control method according to claim 10, wherein the second output step includes outputting the other sounds of the plurality of sounds such that each of the other sounds has a respective sound tone that is different from that of the first sound.

* * * * *